(12) United States Patent
Tieu

(10) Patent No.: US 6,707,269 B2
(45) Date of Patent: Mar. 16, 2004

(54) MOTOR CONTROL CIRCUIT WITH ADAPTIVE DYNAMIC RANGE SELECTION

(75) Inventor: Triet M. Tieu, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 106 days.

(21) Appl. No.: 10/028,681

(22) Filed: Dec. 21, 2001

(65) Prior Publication Data

US 2003/0048083 A1 Mar. 13, 2003

Related U.S. Application Data

(60) Provisional application No. 60/318,897, filed on Sep. 11, 2001.

(51) Int. Cl.$^7$ ............................................. G05B 11/18
(52) U.S. Cl. ......................... 318/592; 318/594; 318/601
(58) Field of Search ................ 318/430, 431, 318/432, 433, 592, 594, 600, 601, 138, 254, 439

(56) References Cited

U.S. PATENT DOCUMENTS

| | | | |
|---|---|---|---|
| 3,686,547 A | * | 8/1972 | Kelling ........................ 318/594 |
| 4,130,769 A | | 12/1978 | Karube |
| 4,132,414 A | * | 1/1979 | Dinsdale ...................... 369/241 |
| 4,169,990 A | | 10/1979 | Lerdman |
| 4,184,108 A | * | 1/1980 | Sordello et al. ............ 318/618 |
| 4,405,885 A | | 9/1983 | Okamoto |
| 4,531,079 A | | 7/1985 | Müller |
| 4,551,664 A | * | 11/1985 | Wong et al. ................. 318/592 |
| 4,574,227 A | * | 3/1986 | Herder et al. ................ 318/594 |
| 4,631,459 A | | 12/1986 | Fujioka et al. |
| 4,633,150 A | | 12/1986 | Inaji et al. |
| 4,712,050 A | | 12/1987 | Nagasawa et al. |
| 4,748,386 A | | 5/1988 | Nakanishi et al. |
| 4,888,533 A | | 12/1989 | Gotoh et al. |
| 4,896,807 A | | 1/1990 | Mundschau |
| 4,992,710 A | | 2/1991 | Cassat |
| 5,001,405 A | | 3/1991 | Cassat |
| 5,028,852 A | | 7/1991 | Dunfield |
| 5,117,165 A | | 5/1992 | Cassat et al. |
| 5,159,246 A | | 10/1992 | Ueki |
| 5,166,583 A | | 11/1992 | Min et al. |
| 5,173,647 A | * | 12/1992 | Hashimoto ................... 318/561 |
| 5,184,038 A | | 2/1993 | Matsui et al. |
| 5,189,574 A | | 2/1993 | Imamura et al. |
| 5,194,788 A | * | 3/1993 | Hashimoto ................... 318/561 |
| 5,254,914 A | | 10/1993 | Dunfield et al. |
| 5,274,310 A | | 12/1993 | Bahn |
| 5,285,135 A | | 2/1994 | Carobolante et al. |
| 5,289,097 A | | 2/1994 | Erickson et al. |
| 5,298,839 A | | 3/1994 | Takeda |
| 5,334,917 A | | 8/1994 | Lind |
| 5,343,127 A | | 8/1994 | Maiocchi |
| 5,378,976 A | | 1/1995 | Inaji et al. |
| 5,397,972 A | | 3/1995 | Maiocchi |

(List continued on next page.)

*Primary Examiner*—Bentsu Ro
(74) *Attorney, Agent, or Firm*—Fellers, Snider, et al.

(57) ABSTRACT

Method and apparatus for controlling a motor. A digital to analog converter (DAC) converts input digital values to corresponding analog voltages over a range of different selectable dynamic operating ranges. A first motor adjustment signal within a first dynamic range of the DAC is generated in relation to a velocity error of the motor, and applied to the DAC to control flow of current through the motor. The DAC is adjusted to a different, second dynamic range when the first motor adjustment signal is proximate an upper end or a lower end of the first dynamic range. Expanding the dynamic range allows greater amounts of current to be applied to the motor; contracting the dynamic range provides higher resolution (volts/count) and greater stability. The different ranges are automatically selected for different motor load conditions.

19 Claims, 6 Drawing Sheets

U.S. PATENT DOCUMENTS

| | | |
|---|---|---|
| 5,428,276 A | 6/1995 | Carobolante et al. |
| 5,541,488 A | 7/1996 | Bansal et al. |
| 5,631,999 A | 5/1997 | Dinsmore |
| 5,703,449 A | 12/1997 | Nagate et al. |
| 5,777,448 A | 7/1998 | Matsui |
| 5,780,983 A | 7/1998 | Shinkawa et al. |
| 5,821,717 A | 10/1998 | Hassan et al. |
| 5,841,252 A | 11/1998 | Dunfield |
| 5,869,946 A | 2/1999 | Carobolante |
| 5,870,363 A | 2/1999 | Sun et al. |
| 5,929,577 A | 7/1999 | Neidorff et al. |
| 5,963,706 A | 10/1999 | Baik |
| 5,982,571 A | 11/1999 | Calfee et al. |
| 5,998,946 A | 12/1999 | Kim |
| 6,054,828 A | 4/2000 | Hill |
| 6,057,978 A | 5/2000 | Hayakawa |
| 6,078,158 A | 6/2000 | Heeren et al. |
| 6,100,656 A | 8/2000 | El-Sadi et al. |
| 6,130,868 A | 10/2000 | Yamamoto |
| 6,160,367 A | 12/2000 | Higashi et al. |
| 6,323,617 B1 | 11/2001 | Maruyama et al. |
| 6,326,756 B1 | 12/2001 | Youn |

\* cited by examiner

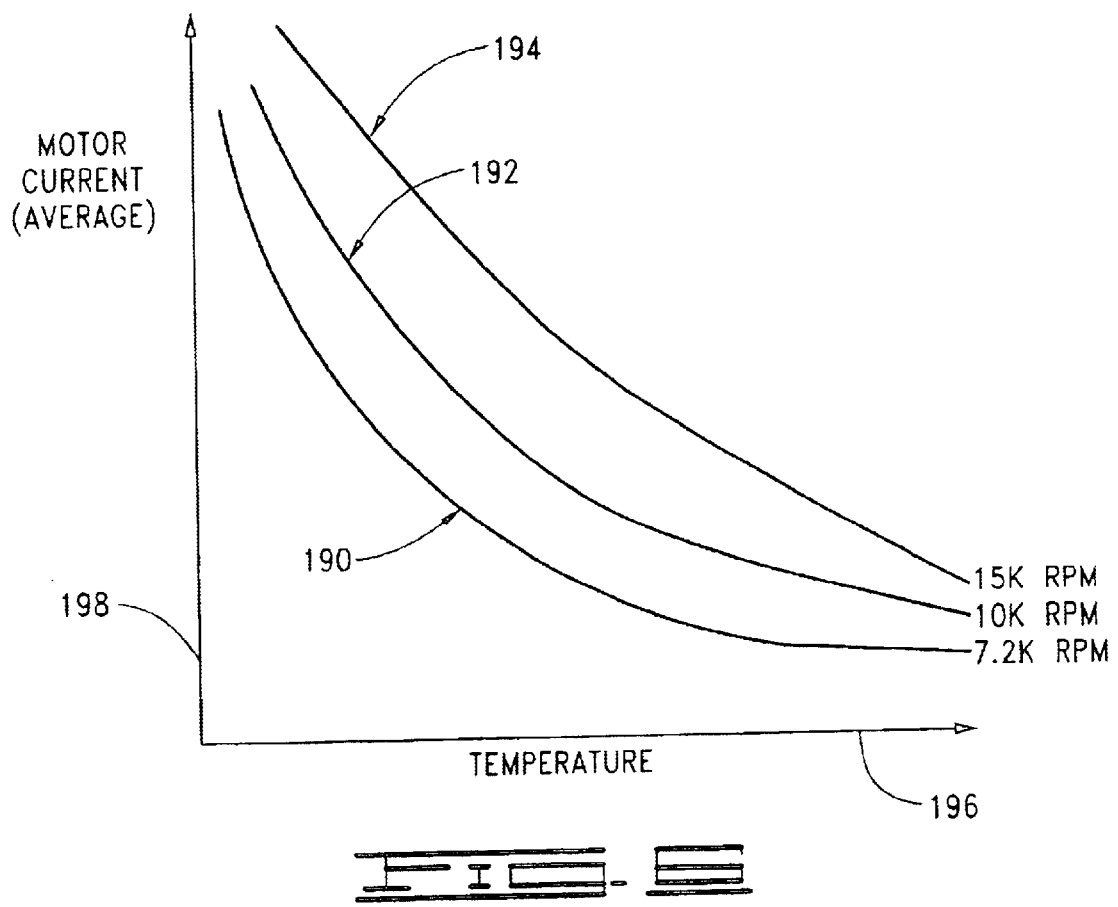

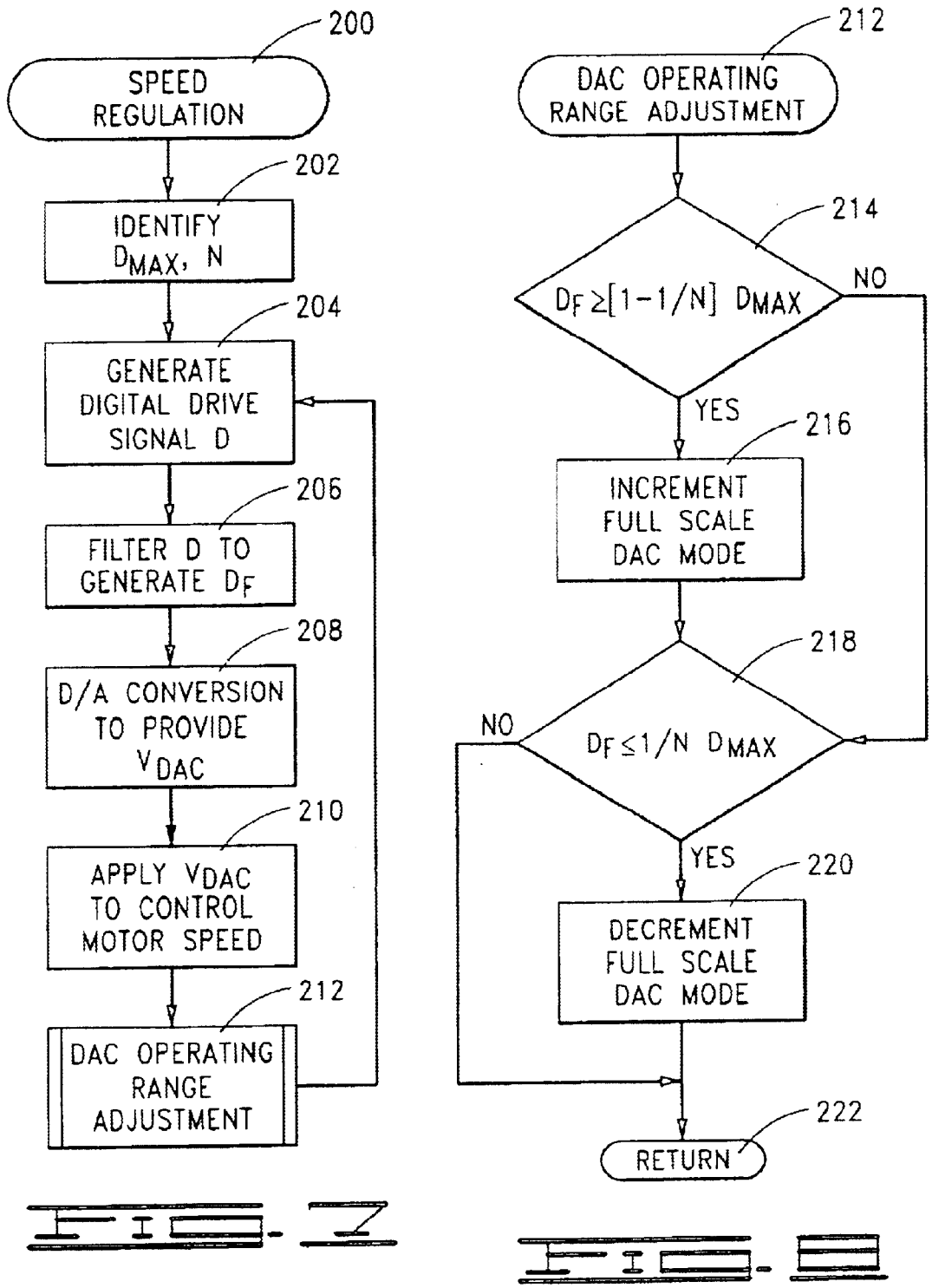

MOTOR CONTROL CIRCUIT WITH ADAPTIVE DYNAMIC RANGE SELECTION

RELATED APPLICATIONS

This application claims priority to United States Provisional Application No. 60/318,897 filed Sep. 11, 2001.

FIELD OF THE INVENTION

The claimed invention relates generally to the field of motor driver circuits and more particularly, but not by way of limitation, to an apparatus and method for operating a disc drive spindle motor which supports a rotatable magnetic recording disc.

BACKGROUND OF THE INVENTION

A disc drive is a data storage device used to store digital data. A typical disc drive includes a number of magnetic recording discs that are axially aligned and mounted to a spindle motor for rotation at a high constant velocity. The spindle motor is mounted to a base deck, which combines with a top cover to provide a sealed housing. A corresponding array of read/write heads access fixed sized data blocks on tracks of the discs to write data to and read data from the discs. In disc drives of the current generation, the discs are rotated at speeds of 15,000 revolutions per minute and more.

Disc drive spindle motors typically have a multi-phase, direct current (dc) brushless motor configuration. The phase windings are arranged about a stationary stator on a number of radially distributed poles. A rotatable spindle motor hub is provided with a number of circumferentially extending permanent magnets in close proximity to the poles. Application of current to the windings induces electromagnetic fields that interact with the magnetic fields of the magnets to apply torque to the spindle motor hub and induce rotation of the discs.

It will be recognized by those of skill in the art that slight variations exist in the operating velocity of a spindle motor during operation, and the importance of controlling and minimizing these variations is increased due to the high operating velocities currently employed in disc drive spindle motors. This importance is paramount due to the difficulty of aligning the read/write heads with data blocks as data is stored or retrieved from a disc.

Motor control circuitry typically uses a digital-to-analog converter (DAC) and field effect transistor (FET) drivers to control the spindle motor. The DAC receives digital reference signals and outputs a corresponding analog current or voltage over a selected dynamic range that modulates the amount of current applied by drive circuitry to the spindle motor. A typical unit of measurement for a DAC is volts per count.

Motor control circuitry may require different full-scale ranges of operation to accommodate different power requirements of the motor. For example, when the motor is at rest the motor needs a large input power to begin rotation. Conversely, much less input power is required to regulate the motor velocity when the motor is running near operating velocity.

The range of power requirements for the spindle motor also depends in part on the type of bearings used to support the spindle motor hub in rotation with respect to the base deck. For spindle motors that use ball bearings, variations in temperature do not greatly affect the friction force encountered by the spindle motor hub. However, fluid dynamic bearings use a lubricant to support the spindle motor hub for rotation with respect to the base deck. The viscosity of this lubricant may be highly temperature dependent such that power requirements to drive the motor vary greatly with temperature.

There is a need, therefore, for an improved disc drive motor control circuit that adaptively adjusts to various full-scale operating ranges to account for different spindle motor configurations and operating conditions.

SUMMARY OF THE INVENTION

In accordance with preferred embodiments, a disc drive data storage device includes a spindle motor which supports at least one magnetic recording disc. Motor control circuitry is configured to rotate the spindle motor at a desired operational velocity. The motor control circuitry includes a digital to analog converter (DAC) assembly which converts input digital signals to corresponding analog signals over a range of different selectable dynamic ranges.

The motor control circuit is preferably operated by initially identifying a first dynamic range of motor adjustment signals which can be initially applied to control operation of the motor. A first motor adjustment signal within the first dynamic range is applied to the DAC assembly to control application of current to the motor. The first motor adjustment signal is determined in relation to a detected motor velocity error.

When the first motor adjustment signal is determined to be proximate a selected one of an upper end or a lower end of the first dynamic range, the first dynamic range of the DAC is adjusted to provide a different, second dynamic range of motor adjustment signals. Thereafter, a second motor adjustment signal within the second dynamic range is applied to control application of current to the motor.

Preferably, the first motor adjustment signal is determined to be proximate the upper end of the first dynamic range when a magnitude of the first motor adjustment signal is between a maximum level of the first dynamic range and a first threshold level between the maximum level and a minimum level of the first dynamic range. The first motor adjustment signal is determined to be proximate the lower end of the first dynamic range when a magnitude of the first motor adjustment signal is between the minimum level and a second threshold level between the minimum level and the maximum level.

Expanding the dynamic range of the DAC allows greater amounts of current to be applied to the motor, which is particularly desirable when a spindle motor having hydrodynamic bearings is operated at a lower temperature. Contracting the dynamic range provides higher resolution (volts/count) and greater stability of the circuit, which is particularly desirable when the motor has achieved steady state operation. The different dynamic ranges are automatically selected for different motor load conditions and accommodate different mechanical configurations of the spindle motor.

These and various other features and advantages which characterize the claimed invention will become apparent upon reading the following detailed description and upon reviewing the associated drawings.

BRIEF DESCRIPTION OF THE DRAWINGS

FIG. 6 graphically depicts the general relationship between load current and temperature for spindle motors having hydrodynamic bearings and rotated at different nominally constant speeds.

FIG. 7 is a flow chart for a SPEED REGULATION routine, generally illustrative of steps carried out in accordance with preferred embodiments of the present invention to regulate the speed of the spindle motor.

FIG. 8 is a flow chart for a FULL-SCALE OPERATING RANGE ADJUSTMENT routine that is a subroutine of the SPEED REGULATION routine of FIG. 7.

DETAILED DESCRIPTION

Figure 1:
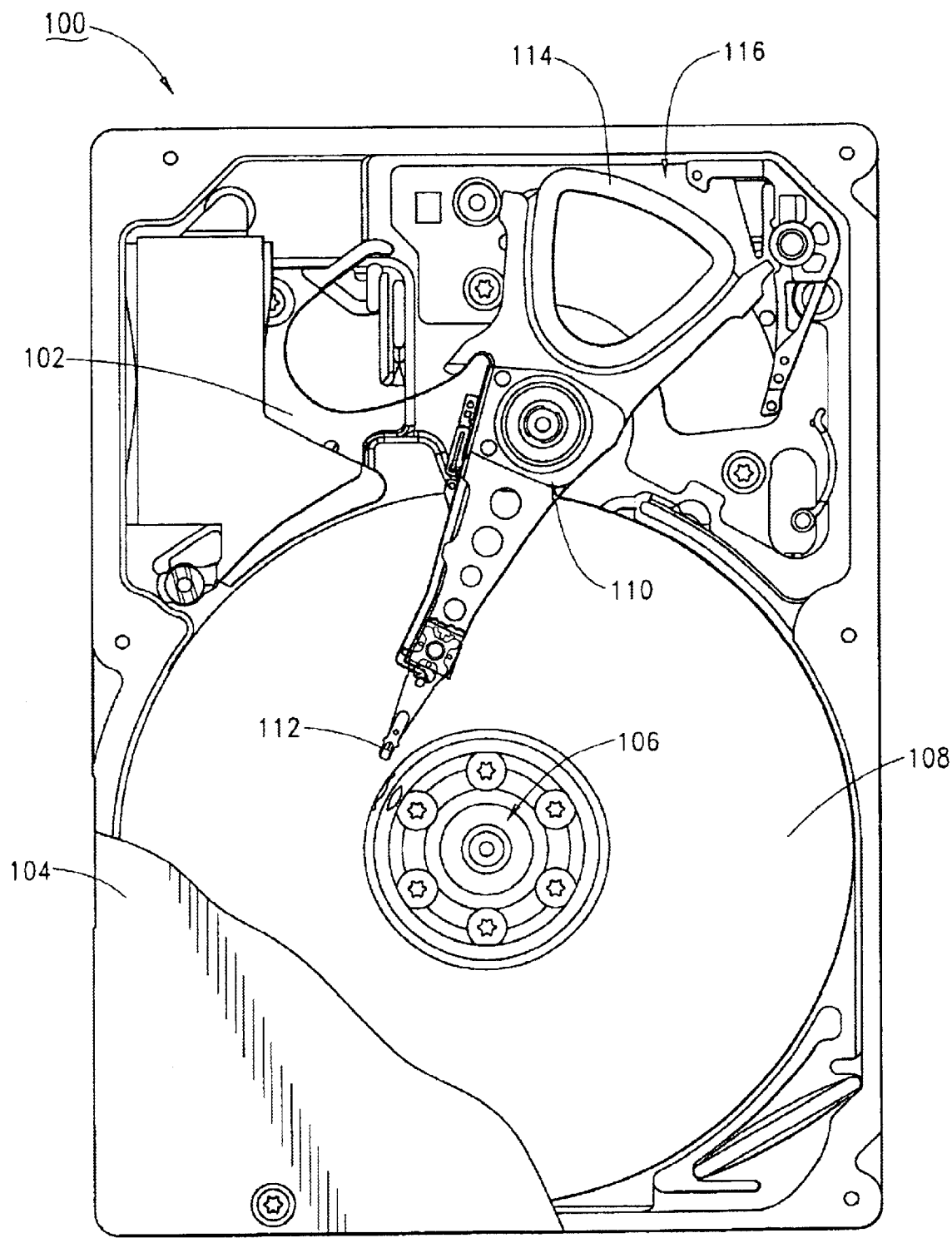
FIG. 1 is a plan view of a disc drive constructed in accordance with preferred embodiments of the present invention.

Referring now to the drawings, FIG. 1 provides a top plan view of a disc drive 100 of the type used to store and retrieve computerized data. A rigid base deck 102 cooperates with a top cover 104 (shown in partial cutaway) to form a sealed housing for the disc drive 100. Electrical communication and control electronics are provided on a disc drive printed circuit board (PCB) affixed to the underside of the base deck 102 (and hence not visible in FIG. 1).

A spindle motor 106 rotates a number of rigid data recording discs 108 at a constant high speed. It is contemplated that the spindle motor employs internal hydrodynamic bearings (not shown) to facilitate rotation of the discs 108. An actuator assembly 110 supports an array of read/write heads 112 adjacent the respective disc surfaces. The actuator assembly 110 is rotated through the application of current to an actuator coil 114 of a voice coil motor (VCM) 116.

Figure 2:
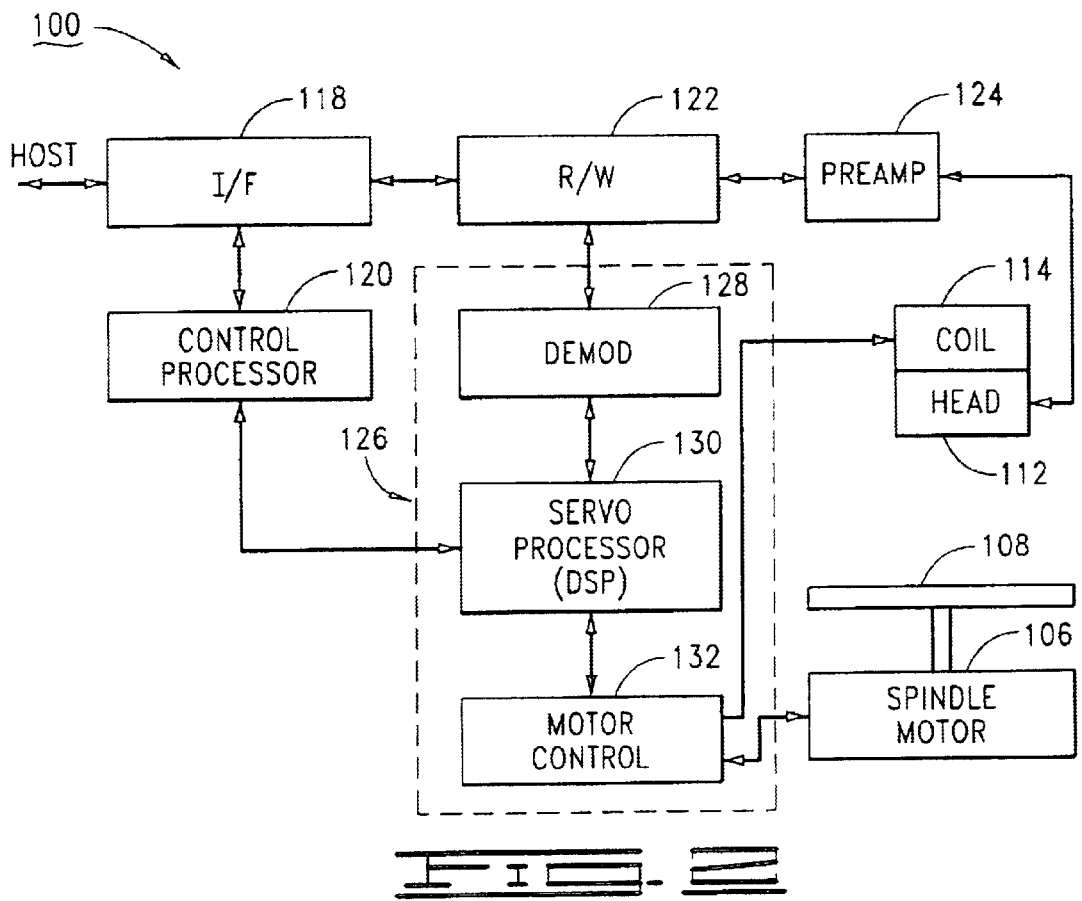
FIG. 2 provides a functional block diagram of the disc drive of FIG. 1.

FIG. 2 provides a functional block diagram of relevant portions of the disc drive 100. Host commands from a host device (not shown) are serviced by interface (I/F) circuitry 118 and a top level control processor 120. Data are transferred between the discs 108 and the host device using the I/F circuitry 118, a read/write (R/W) channel 122, a preamplifier/driver (preamp) circuit 124, and the heads 112.

Head positional control is provided by a closed-loop servo circuit 126 comprising demodulation (demod) circuitry 128, a servo processor 130 (preferably comprising a digital signal processor, or DSP) and motor control circuitry 132. The motor control circuitry 132 applies drive currents to the actuator coil 114 to rotate the actuator 110 (FIG. 1) and thereby positions the heads 112. The motor control circuitry 132 further applies drive signals to the spindle motor 106 to rotate the discs 108.

Figure 3:
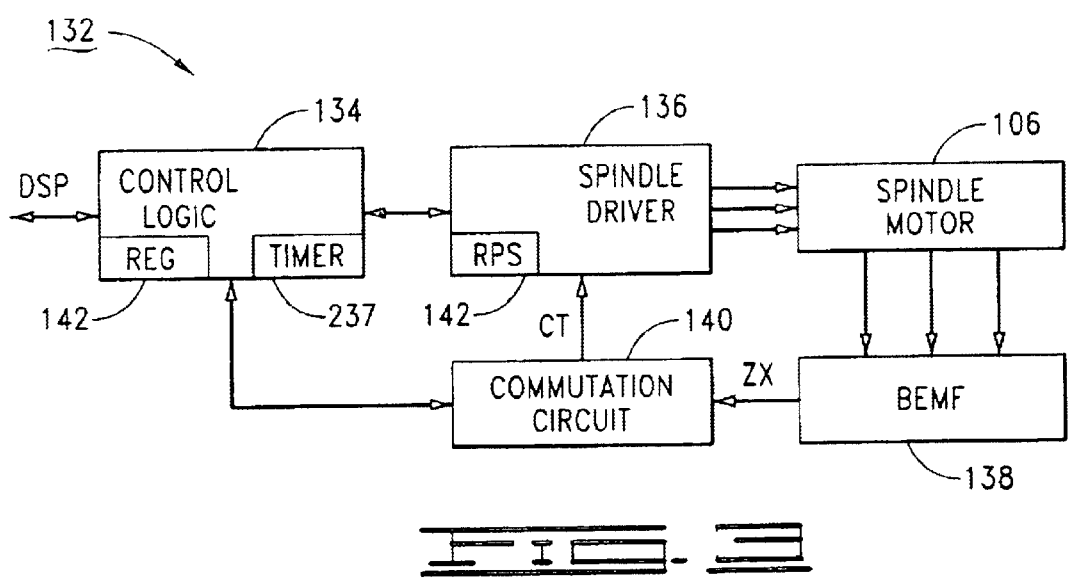
FIG. 3 provides a functional block diagram of relevant portions of the motor control circuitry of FIG. 2.

FIG. 3 provides a functional block diagram of relevant portions of the motor control circuitry 132 of FIG. 2. Control logic 134 receives commands from and outputs state data to the DSP 130. Spindle driver circuitry 136 applies drive currents to the phases of the spindle motor 106 over a number of sequential commutation steps to rotate the motor.

Back electromagnetic force (bemf) detection circuitry 138 measures the bemf generated by the spindle motor windings, compares this voltage to the voltage at a center tap, and outputs a zero crossing (ZX) signal when the bemf voltage changes polarity with respect to the voltage at the center tap. A commutation circuit 140 uses the ZX signals to generate and output commutation timing (CT) signals to time the application of the next commutation step.

Figure 4:
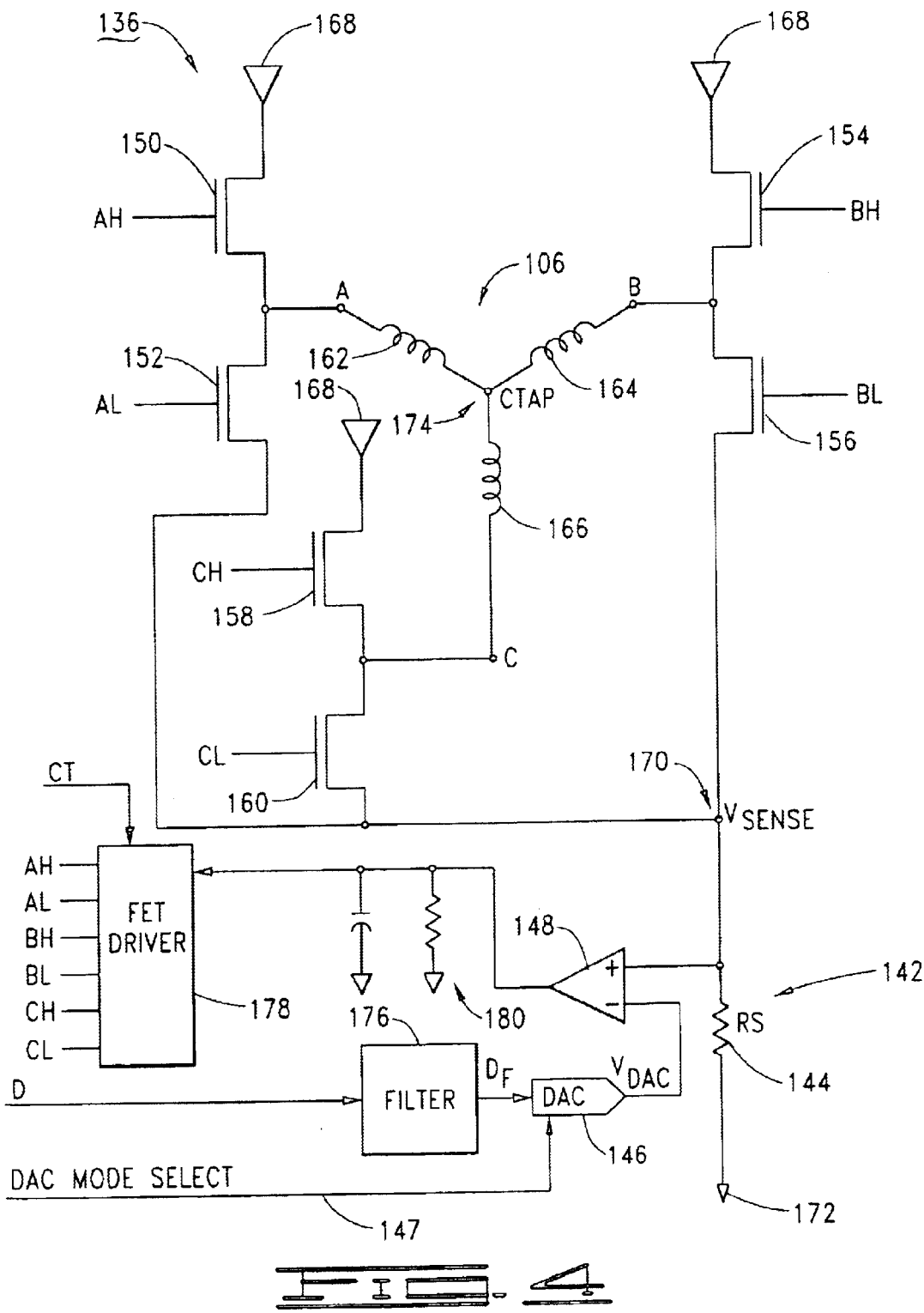
FIG. 4 provides a functional block diagram of spindle driver circuitry shown in FIG. 3.

FIG. 4 shows the spindle motor driver circuitry 136 to include a sense resistor RS 144, a digital to analog converter (DAC) 146 and a comparator 148. Six field effect transistors (FETs) 150, 152, 154, 156, 158 and 160, with inputs denoted as AH (A high), AL (A low), BH, BL, CH and CL, respectively, are selectively controlled so that current flows through A, B and C phase windings 162, 164 and 166 from a voltage source 168 to a voltage sense ($V_{SENSE}$) node 170, through the RS sense resistor 144 to reference node (ground) 172.

In a preferred embodiment, motor speed control is established by a digital signal D provided from the control logic 134. The D reference signal values are preferably filtered by a filter 176 to provide filtered reference signals $D_F$ to the DAC 146. The filter 176 preferably comprises a time averaged filter or a digital low pass filter. The corresponding analog output from the DAC 146 serves as a reference voltage for the comparator 148. The comparator 148 compares the voltage at node 170 with the reference voltage and provides a comparison signal to a FET driver circuit 178. High frequency components of the comparison signal are filtered by a filter network 180.

The FET driver 178 applies the appropriate inputs to the FETs 150, 152, 154, 156, 158 and 160 at the appropriate times to commutate the spindle motor 106. For example, to direct current from A phase winding 162 to B phase winding 164, the AH and BL FETs 150, 158 are turned on and the remaining FETs are turned off. It will be noted that the FET driver 178 preferably maintains the high side FET on in a continuous state and modulates (turns on and off) the low side FET during each commutation step to maintain the current flowing through the motor at a magnitude dictated by the reference level (voltage) at the—input of the comparator 148.

Figure 5:
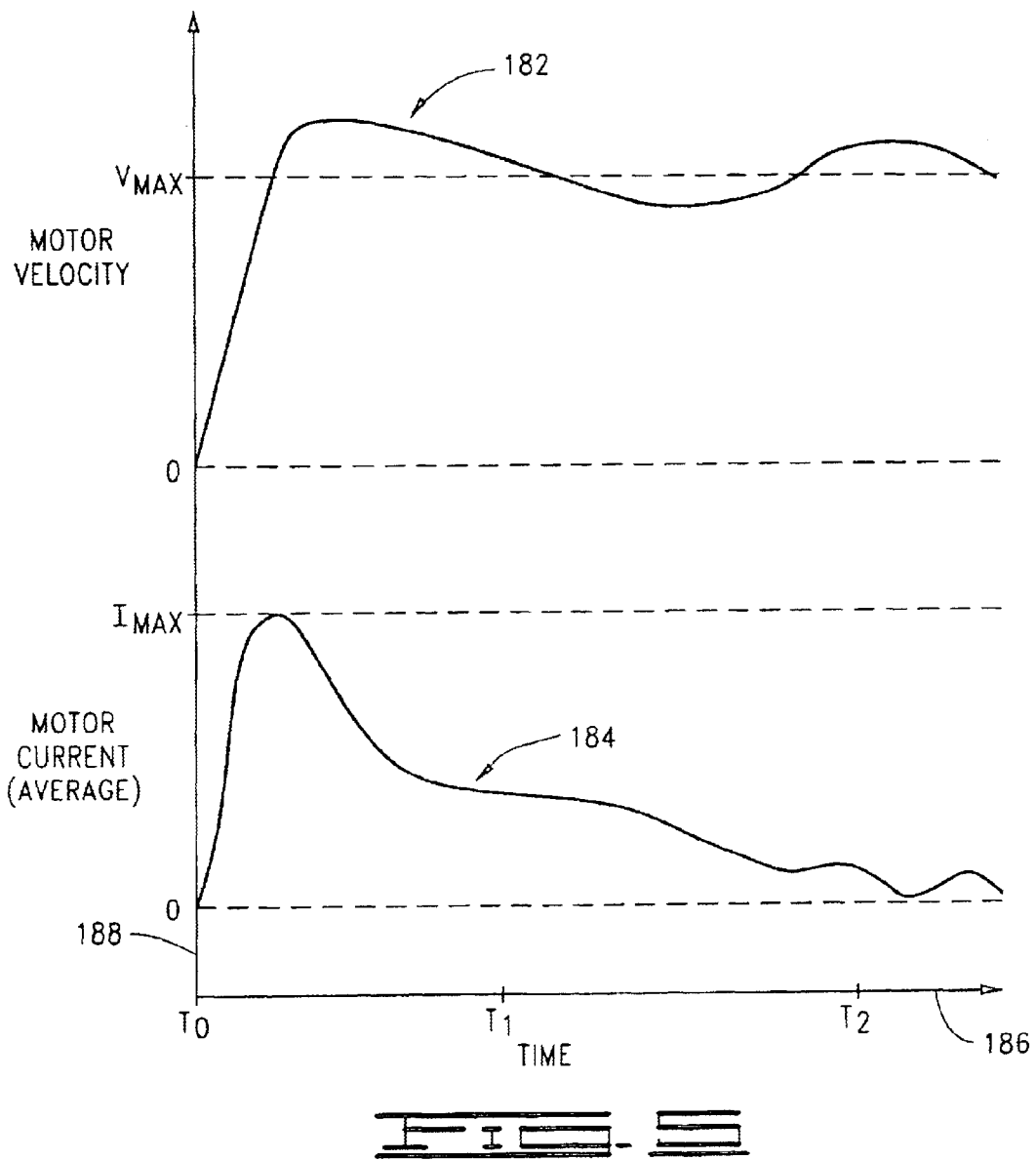
FIG. 5 graphically depicts motor velocity and average motor current to illustrate typical variations in motor load current at different operational times.

The spindle motor 106 has different power requirements based on different operational configurations, as illustrated by FIG. 5. FIG. 5 shows a motor velocity curve 182 and a motor current curve 184, both plotted against an x-axis 186 indicative of elapsed time and a common y-axis 188. Initial acceleration of the spindle motor 106 from rest (at time $T_0$) typically requires a high value of current relative to operation at steady-state velocity. As indicated in FIG. 5, the average motor current reaches a value $I_{MAX}$ shortly upon acceleration of the spindle motor. As the spindle motor 106 reaches the operating velocity $V_{MAX}$ (at time $T_1$) the average motor current requirement decreases substantially. Current requirements further decrease over time as the lubricant in the spindle motor hydrodynamic bearings heats up and achieves lower viscosity, such as shown at time $T_2$.

The DAC 146 is configured to output different analog voltage ranges to account for resolution needs at different operating conditions. Preferably, the DAC 146 has four selectable modes, referred to as A, B, C and D. For example the DAC 146 can provide a full-scale range of 0.1 volt in mode A, a full-scale range of 0.2 volt in mode B, a full-scale range of 0.4 volt in mode C, and a full-scale range of 0.8 volt in mode D. As each mode uses the same range of digital input values for the reference signal D, the higher modes provide larger full-scale current, but at a lower resolution (volts/digital count). Conversely, the lower modes provide smaller full-scale current, but at a higher resolution. The DAC modes are selected by DAC select mode signals provided on path 147 from the control logic 134 and servo processor 130. Other numbers and values of dynamic ranges can readily be employed, depending upon the requirements of a given application.

FIG. 6 generally depicts the relationship between load current and temperature for a number of spindle motors that use hydrodynamic bearings and are rotated at different constant speeds. Current curve 190 represents operation of such a spindle motor operated at 7200 (7.2K) revolutions per minute (RPM). Curve 192 and 194 represent such motors operated at 10K and 15K RPM. The curves are plotted against an x-axis 196 generally indicative of temperature and a y-axis 198 generally indicative of average current magnitude. It can be readily seen that maintaining the same operational speed of a motor can require significantly different amounts of current, depending on the temperature of the lubricants in the bearings.

FIG. 7 shows a SPEED REGULATION routine 200 generally illustrative of steps carried out in accordance with preferred embodiments of the present invention to regulate the speed of the spindle motor of the disc drive 100. At step 202, parameters $D_{MAX}$ and N are initially identified. $D_{MAX}$ is determined by the selected DAC mode and represents the maximum level of the motor adjustment signal voltage for the full-scale dynamic operating range of the DAC in the selected mode (e.g., 0.1, 0.2, 0.4 or 0.8 volts). The minimum voltage level of the full-scale range is preferably zero.

The constant N is a value chosen such that the quantities $(1/N) D_{MAX}$ and $[1-1/N]D_{MAX}$ define thresholds that form discrete segments proximate the lower and upper ends of the full-scale dynamic range of the DAC (i.e., from zero to $D_{MAX}$). The lower end discrete segment is defined by the range zero to the threshold $(1/N)D_{MAX}$ and the upper end segment is defined by the range from the threshold $[1-1/N] D_{MAX}$ to $D_{MAX}$. It will be recognized that upper and lower thresholds can be defined in other ways, such as by percentages of $D_{MAX}$. Thus, the particular form of the first and second thresholds shown above is illustrative, not limiting.

At step 204, the digital drive signal D is generated in relation to motor velocity (speed) error, which in turn is determined in relation to a difference between the actual velocity of the spindle motor 106 and the desired velocity of the motor. A proportional and integral (PI) controller (not shown) or other suitable controller format can be used as desired to generate the digital drive signal D. At step 206, the digital drive signal D is filtered by the filter 176 (FIG. 4) to produce the time-averaged filtered signal $D_F$, which is also referred to herein as a digital motor adjustment signal.

The routine then passes to a DAC OPERATING RANGE ADJUSTMENT routine 208 that determines whether the currently selected DAC mode is appropriate for the existing motor configuration and load requirements. The routine 208 is shown more fully in FIG. 8, and is discussed in greater detail below.

At this point however, it will be noted that at the conclusion of step 208 the routine of FIG. 7 continues to step 210, wherein the DAC 146 generates the analog voltage $V_{DAC}$ and to step 212, wherein the $V_{DAC}$ value is used to control the velocity of the spindle motor 106.

Reference is now made to the DAC OPERATING RANGE ADJUSTMENT routine 208 of FIG. 8.

At decision step 214 the routine checks to determine whether the circuit is operating at the upper end of the dynamic range of the DAC 146; that is, whether the digital motor adjustment signal $D_F$ is greater than the threshold $[1-1/N]D_{MAX}$. If so, the routine passes to step 216 where the DAC 146 is incremented to the next higher mode. For example, if the DAC 146 is initially set in step 202 (FIG. 6) in mode B so that the initial value of $D_{MAX}$ is set at 0.2 volts, step 216 will cause a transition to mode C so that the dynamic range is expanded from 0–0.2 volts to 0–0.4 volts.

Expanding the dynamic range of the DAC 146 in this manner allows application of more current to the spindle motor 106 and brings the operation of the circuit closer to the middle of the dynamic range of the DAC 146.

The filter 180 (FIG. 4) will filter transients in the output of the comparator 148 to help assure a smooth transition to the next dynamic range. Once the new DAC mode has been selected at step 216, the routine 208 returns at step 222 back to the routine of FIG. 7, allowing the spindle driver circuitry 136 to generate the digital drive signal D in accordance with the newly selected operating range during the next pass through the routine.

Returning to decision step 214 of FIG. 8, when the value of $D_F$ is not at the upper end of the dynamic range of the DAC 146, the routine passes to step 218 to determine whether the DAC 146 is operating at the lower end of the dynamic range. That is, decision step 218 determines whether the value of $D_F$ is less than (or equal to) the quantity $[1/N]D_{MAX}$.

If so, the routine passes to step 220 where the DAC mode is decremented to a lower mode. This serves to contract the dynamic range, providing greater resolution (volts/count) and allowing the circuit to operate toward the middle portions of the range. Using the example above which uses an initial DAC setting to mode B (with $D_{MAX}$=0.2 volts), the operation of step 220 results in a switch to mode A (so that $D_{MAX}$=0.1 volts).

The routine then returns at step 222 as before and the next pass through the routine of FIG. 7 uses the new dynamic range to control the spindle motor 106. When the value of $D_F$ is determined to be in a midrange between $[1/N]D_{MAX}$ and $(1-[1/N])D_{MAX}$, no changes to the dynamic range are necessary and the routine of FIG. 8 returns without adjustment.

It will be noted that the routines of FIGS. 7 and 8 automatically adapt for various load conditions of the drive and ensure that the DAC 146 will operate at the appropriate resolution. The effects of different environmental conditions (such as temperature) can be compensated automatically without a need to periodically poll a separate temperature sensor and determine appropriate times to make changes in the dynamic range of the DAC 146. Also, it is contemplated that the same circuit can accommodate a large variety of different mechanical configurations of spindle motor (i.e., different numbers of discs) and automatically select the appropriate range for the particular load, simplifying the required firmware code set of the drive and eliminating the need to verify the particular configuration of the drive.

While preferred embodiments presented above have used a single DAC 146 with selectable output ranges, it will readily be understood that other configurations, such as a bank of individually selectable discrete DACs, each with a respective, different dynamic range, can also readily be implemented. While the digital motor adjustment signals D and $D_F$ have been characterized as multibit digital values, such signals can also comprise other forms such as a pulse width modulated (PWM) format.

It will now be understood that the present invention, as embodied herein and as claimed below, is generally directed to a method and apparatus for controlling a motor. In accordance with preferred embodiments, a disc drive data storage device (such as 100) includes a spindle motor (such as 106) which supports at least one magnetic recording disc (such as 108). Motor control circuitry (such as 136) is configured to rotate the spindle motor at a desired operational velocity. The motor control circuitry includes a digital to analog converter (DAC) assembly (such as 146) which converts input digital signals to corresponding analog signals over a range of different selectable dynamic ranges.

The motor control circuit is preferably operated by initially identifying a first dynamic range of motor adjustment signals which can be applied to control operation of the motor (such as by step 202 of FIG. 7). A first motor adjustment signal within the first dynamic range is applied to the DAC assembly to control application of current to the motor, with the first motor adjustment signal determined in relation to a detected motor velocity error (such as by step 210 of FIG. 7).

When the first motor adjustment signal is proximate a selected one of an upper end or a lower end of the first dynamic range, the first dynamic range of the DAC is adjusted to provide a different, second dynamic range of motor adjustment signals (such as by steps 216, 220 of FIG. 8). Thereafter, a second motor adjustment signal within the second dynamic range is applied to control application of current to the motor (step 212 of FIG. 7).

The first motor adjustment signal is determined to be proximate the upper end of the first dynamic range when a magnitude of the first motor adjustment signal is between a maximum level of the first dynamic range and a threshold level between the maximum level and a minimum level of the first dynamic range (such as by step 214 of FIG. 8). The first motor adjustment signal is determined to be proximate the lower end of the first dynamic range when a magnitude of the first motor adjustment signal is between the minimum level and a threshold level between the minimum level and the maximum level (such as by step 218 of FIG. 8).

For purposes of the appended claims, the structure corresponding to the recited function of the "first means" will be understood to correspond to selected portions of the control logic 134 in conjunction with operation of the servo processor 130.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the operating range adjustment routine without departing from the spirit and scope of the present invention.

In addition, although the embodiments described herein are directed to an operating range adjustment routine for a disc drive, it will be appreciated by those skilled in the art that the routine can be used for other devices besides disc drives without departing from the spirit and scope of the claimed invention.

What is claimed is:

1. A method for controlling a motor, comprising:
   applying a first motor adjustment signal selected from a first dynamic range of motor adjustment signals to control a flow of current through the motor;
   monitoring a magnitude of the first motor adjustment signal and, when the first motor adjustment signal is proximate a selected one of an upper end or a lower end of the first dynamic range, adjusting the first dynamic range to provide a different, second dynamic range of motor adjustment signals; and
   subsequently applying a second motor adjustment signal selected from the second dynamic range to control application of current to the motor.

2. The method of claim 1, wherein the adjusting step comprises expanding the first dynamic range so that the second dynamic range is larger than the first dynamic range when the first motor adjustment signal is proximate the upper end of the first dynamic range.

3. The method of claim 2, wherein the first dynamic range has a minimum level and a maximum level and wherein the first motor adjustment signal is determined during the adjusting step to be proximate the upper end of the first dynamic range when a magnitude of the first motor adjustment signal is between the maximum level and a threshold level between the minimum level and the maximum level.

4. The method of claim 3, wherein the maximum level is characterized as value $D_{MAX}$ and the threshold level is characterized as a value $(1-[1/N])D_{MAX}$, where N is a constant.

5. The method of claim 1, wherein the adjusting step comprises contracting the first dynamic range so that the second dynamic range is smaller than the first dynamic range when the first motor adjustment signal is proximate the lower end of the first dynamic range.

6. The method of claim 5, wherein the first dynamic range has a minimum level and a maximum level and wherein the first motor adjustment signal is determined during the adjusting step to be proximate the lower end of the first dynamic range when a magnitude of the first motor adjustment signal is between the minimum level and a threshold level between the minimum level and the maximum level.

7. The method of claim 6, wherein the maximum level is characterized as a value $D_{MAX}$, the minimum level is characterized as a value $D_{MIN}$ and the threshold level is characterized as a value $(1/N)D_{MAX}$, where N is a constant.

8. The method of claim 1, wherein the first and second dynamic ranges respectively comprise ranges of a digital to analog converter (DAC), wherein the DAC outputs voltages in response to the first and second motor adjustment signals that are compared to a voltage at a node of the motor to control a flow of current through the motor.

9. The method of claim 1, wherein the first and second motor adjustment signals respectively comprise multibit digital values.

10. The method of claim 1, wherein the motor comprises a spindle motor which rotates a magnetic recording disc in a disc drive data storage device.

11. The method of claim 1, wherein the motor uses at least one hydrodynamic bearing to facilitate rotation of the motor, and wherein the applying and adjusting steps are carried out while the motor is rotated at a nominally constant velocity.

12. A disc drive, comprising:
   a spindle motor configured to rotate a magnetic recording disc on which user data are stored by a data transducing head; and
   a motor control circuit coupled to the spindle motor, comprising:
      a digital to analog (DAC) assembly which converts input digital values to corresponding analog voltages over a range of different selectable dynamic ranges;
      control logic which generates a first motor adjustment signal within a first dynamic range of the DAC assembly, the first motor adjustment signal generated in relation to a velocity error of the spindle motor, wherein the DAC assembly outputs an analog voltage in response to the first motor adjustment signal to control flow of current through the spindle motor; and first means for adjusting the DAC assembly to a second dynamic range when the first motor adjustment signal is proximate a selected one of an upper end or a lower end of the first dynamic range so that a subsequent second motor adjustment signal generated by the control logic is provided within the second dynamic range.

13. The disc drive of claim 12, wherein the first means comprises a selection circuit coupled to the control logic, wherein the selection circuit determines the first motor adjustment signal to be proximate the upper end of the first dynamic range when a magnitude of the first motor adjustment signal is between a maximum level of the first dynamic range and a threshold level between the maximum level and a minimum level of the first dynamic range, and wherein the selection circuit determines the first motor adjustment signal to be proximate the lower end of the first dynamic range when a magnitude of the first motor adjustment signal is between the minimum level and a threshold level between the minimum level and the maximum level.

14. The disc drive of claim 13, wherein the selection circuit comprises a programmed servo processor device.

15. Apparatus, comprising:

a digital to analog converter (DAC) with multiple selectable modes each providing a different range of analog output voltages for a common range of digital input values;

control logic which applies a first digital input value to the DAC to generate a corresponding first analog output voltage to control a motor while the DAC is operated in a first one of said multiple selectable modes; and selection circuitry which monitors the first digital input value and, when said input value is proximate an upper or a lower end of the common range of digital input values, adjusts the DAC to a second one of said multiple selectable modes.

16. The apparatus of claim 15, wherein the selection circuit determines the first digital input value to be proximate the upper end of the common range of digital input values when a magnitude of the first digital input value is between a maximum level of the common range of digital input values and a threshold level.

17. The apparatus of claim 15, wherein the selection circuit determines the first digital input value to be proximate the lower end of the common range of digital input values when a magnitude of the first digital input value is between a minimum level of the common range of digital input values and a threshold level.

18. The apparatus of claim 15, wherein the motor comprises a spindle motor which rotates a magnetic recording disc in a disc drive data storage device.

19. The apparatus of claim 15, wherein the selection circuit operates to adjust the DAC to the second one of said multiple selectable modes while the motor is operated at a nominally constant velocity.

* * * * *